US008806310B2

(12) United States Patent
Li et al.

(10) Patent No.: US 8,806,310 B2
(45) Date of Patent: Aug. 12, 2014

(54) RATE MATCHING AND DE-RATE MATCHING ON DIGITAL SIGNAL PROCESSORS

(75) Inventors: Yuan Li, San Diego, CA (US); Julien Nicolas, San Diego, CA (US); Jianbin Zhu, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 13/100,190

(22) Filed: May 3, 2011

(65) Prior Publication Data

US 2011/0276767 A1    Nov. 10, 2011

Related U.S. Application Data

(60) Provisional application No. 61/330,710, filed on May 3, 2010.

(51) Int. Cl.
*H03M 13/03* (2006.01)
*H04L 1/00* (2006.01)

(52) U.S. Cl.
CPC .................................. *H04L 1/0068* (2013.01)
USPC .......................................... 714/790; 714/774

(58) Field of Classification Search
USPC .......................................... 714/790, 763, 774
See application file for complete search history.

(56) References Cited

U.S. PATENT DOCUMENTS 7,269,783 B2 *  9/2007  Barry et al. .................... 714/790
7,280,609 B2 * 10/2007  Dottling et al. ............... 375/295
7,451,383 B2 * 11/2008  Kim et al. ...................... 714/786
7,764,743 B2 *  7/2010  Farag ............................. 375/265
8,510,609 B2 *  8/2013  Gil et al. ........................ 714/702
2007/0266302 A1 * 11/2007  Barry et al. .................... 714/790
2008/0046800 A1 *  2/2008  Pietraski et al. .............. 714/790
2008/0320373 A1 * 12/2008  Kim et al. ...................... 714/790
2009/0049360 A1 *  2/2009  Shen et al. ..................... 714/752
2012/0044883 A1 *  2/2012  Jang et al. ...................... 370/329

OTHER PUBLICATIONS

Xiyuan Chen; Honglin Zhao; Yongkui Ma; Xiangnan Liu; , "A novel puncturing scheme for rate-compatible low-density parity-check codes," Communications and Networking in China (CHINACOM), 2011 6th International ICST Conference on , vol., No., pp. 565-568, Aug. 17-19, 2011.*

Mizhou Tan; Ibars, C.; Bar-Ness, Y., "Rate-adaptive convolutional coded fixed spreading length (CCFSL) scheme for multi-rate MC-CDMA," Wireless Personal Multimedia Communications, 2002. The 5th International Symposium on , vol. 2, No., pp. 663,667 vol. 2, Oct. 27-30, 2002.*

(Continued)

*Primary Examiner* — Cynthia Britt

(57) ABSTRACT

Provided are systems and methods for rate matching and de-rate matching on digital signal processors. For example, there is a system for rate matching and de-rate matching, where the system includes a memory configured to contain a plurality of blocks of data, and a digital signal processor configured to pre-compute permutation parameters common to the plurality of blocks, wherein the plurality of blocks are subject to a set of given puncturing parameters. The digital signal processor is configured to process each block in the plurality of blocks by computing a block signature from pre-computed puncturing thresholds, matching the block signature to one of a set of pre-computed zone signatures, deriving a zone index corresponding to the one matched pre-computed zone signature, and applying pre-computed permutation and puncturing transformations corresponding to the zone index to the block.

5 Claims, 2 Drawing Sheets

(56) References Cited

OTHER PUBLICATIONS

Jung-Fu Cheng; Nimbalker, A.; Blankenship, Y.; Classon, B.; Blankenship, T.K., "Analysis of Circular Buffer Rate Matching for LTE Turbo Code," Vehicular Technology Conference, 2008. VTC 2008-Fall. IEEE 68th , vol., No., pp. 1,5, Sep. 21-24, 2008.*

Hichan Moon; Cox, D.C., "Performance of unequally punctured convolutional codes," Wireless Communications, IEEE Transactions on , vol. 8, No. 8, pp. 3903,3909, Aug. 2009.*

* cited by examiner

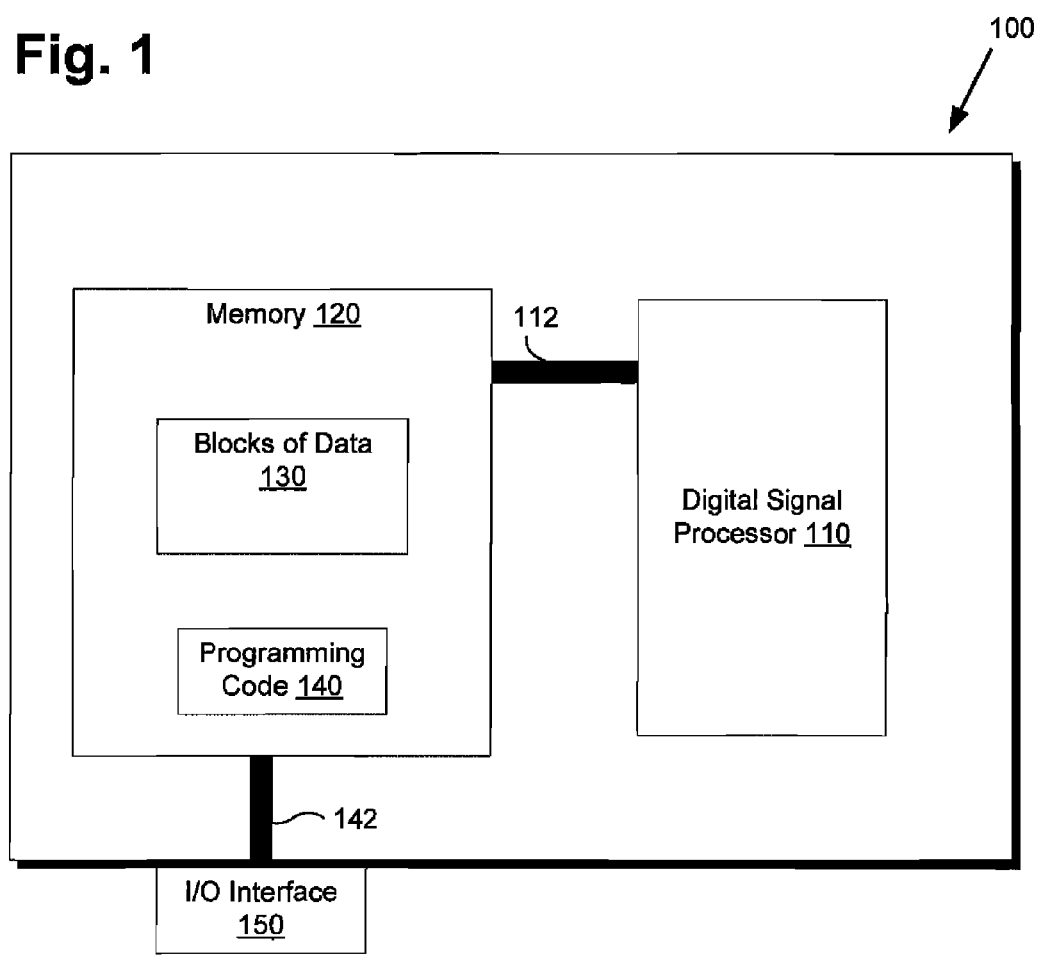

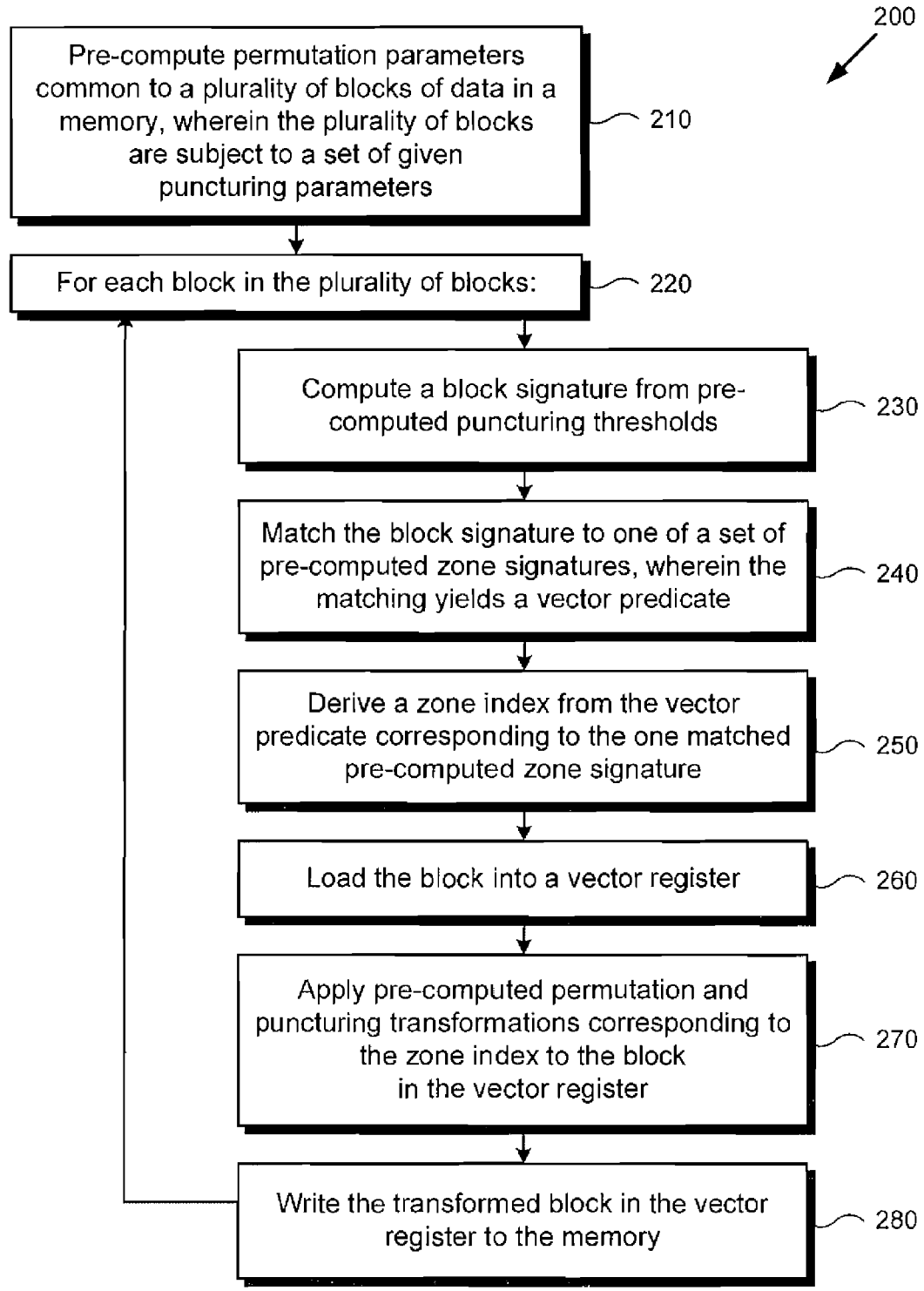

RATE MATCHING AND DE-RATE MATCHING ON DIGITAL SIGNAL PROCESSORS

RELATED APPLICATIONS

This application claims priority to U.S. Provisional Application No. 61/330,710, filed May 3, 2010, which is hereby incorporated by reference in its entirety.

BACKGROUND OF THE INVENTION

1. Field of the Invention

The present invention relates generally to digital signal processing. More particularly, the present invention relates to rate matching and de-rate matching using digital signal processing.

2. Background Art

Rate matching and de-rate matching for data transmissions is commonly employed across a wide range of wired and wireless communications. However, current methods employ largely brute-force strategies where each bit in a particular bitstream must be compared to individualized parameters before the bit is allowed to participate in a transmitted bitstream. For example, a direct implementation of a conventional puncturing function for rate matching may utilize most if not all available processing power of a general computation unit while attempting to perform rate-matching or de-rate matching for contemporary bitstream bandwidths.

Accordingly, there is a need to overcome the drawbacks and deficiencies in the art by providing systems and methods for efficient and cost effective rate matching and de-rate matching on digital signal processors.

SUMMARY OF THE INVENTION

The present application is directed to rate matching and de-rate matching on digital signal processors, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 presents a diagram of a system for rate matching and de-rate matching, according to one embodiment of the present invention;

FIG. 2 presents a flowchart of a method for rate matching and de-rate matching, according to one embodiment of the present invention.

DETAILED DESCRIPTION OF THE INVENTION

The present application is directed to rate matching and de-rate matching on digital signal processors. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of a system 100 for rate matching and de-rate matching, according to an embodiment of the present invention. System 100 includes digital signal processor 110, memory 120, blocks of data 130, programming code 140 and input/output {I/O} interface 150. Digital signal processor 110 may comprise any processor, for example, that can be configured to execute programming code and process data in vector form, for instance. For example, digital signal processor may be configured to execute programming code used to transform vector data, for example, according to permutation and puncturing transforms, for instance, to compare elements of vector data, and to perform iterative mathematical or other processing steps to vector data or elements of vector data. Digital signal process 110 may also be configured to perform memory operations, for example, that affect data within memory 120.

Memory 120 may comprise any device capable of storing blocks of data 130 and/or programming code 140, as shown in FIG. 1. Memory 120 may be configured to allow digital signal processor 110 to access blocks of data 130 and/or programming code 140, for example, using link 112. In addition, although not explicitly shown in FIG. 1, memory 120 may be configured to allow other devices to access blocks of data 130 and/or programming code 140 using link 142 and I/O interface 150, for example, in order to allow external devices to provide blocks of data 130 to digital signal processor 110, for instance.

Blocks of data 130 may comprise any set of data that can be segmented into blocks, for example, for processing by digital signal processor 110. Blocks of data 130 may include one or more subsets of blocks of data subject to corresponding sets of given puncturing parameters, for example, as will be explained more fully below. Blocks of data may also include pre-computed permutation parameters common to a one or more subsets of blocks of data, for example, that may be provided by digital signal processor 110 executing programming code 140. Programming code 140 may comprise code executable by digital signal processor 110, for example, and may comprise permutation and puncturing transforms, compare functions, Boolean functions, iterative functions and the like.

Although system 100 depicts digital signal processor 110 separate from memory 120 and I/O interface 150, it should be understood that the embodiment shown in FIG. 1 is not meant to limit the scope of the present inventive concepts. For example, in other embodiments, memory 120 and/or I/O interface 150 may be integrated with digital signal processor 110, for example. In such embodiments, links 112 and 142 may be omitted, for example, or may also be integrated into digital signal processor 110.

FIG. 2 shows a flow chart illustrating a method for a digital signal processor, such as digital signal processor 110 of FIG. 1 for example, for rate matching or de-rate matching, according to an embodiment of the present invention. Certain details and features have been left out of flowchart 200 that are apparent to a person of ordinary skill in the art. For example, a step may consist of one or more substeps or may involve specialized equipment, as known in the art. Steps 210 through 280 indicated in flowchart 200 are sufficient to describe one embodiment of the present invention; however, other embodiments of the invention may make use of steps different from those shown in flowchart 200. Although steps 210 through 280 are described below with reference to system 100 in FIG. 1 for clarity, it should be understood that the method shown in FIG. 2 is not limited to only the embodiment shown in FIG. 1. For example, in other embodiments, the present inventive method may be performed cooperatively by multiple digital signal processors accessing multiple different memories, for instance.

Referring to step 210 of the method embodied in FIG. 2, step 210 of flowchart 200 comprises pre-computing permutation parameters common to blocks of data 130 in memory 120, wherein blocks of data 130 are subject to a set of given puncturing parameters. Each block of data in blocks of data 130 may comprise a vector of bits having a particular vector size N, for example, and is subject to a particular set of puncturing parameters, such as e− and e+, for example, which is provided by upper layers in a particular data transmission system, as known in the art. It can be shown that blocks subject to substantially the same set of puncturing parameters may be processed using common permutation parameters, for example, that can be pre-computed to make rate matching or de-rate matching substantially more efficient.

Permutation parameters that may be pre-computed from, for example, a set of puncturing parameters, may comprise, for example, a vector of puncturing thresholds determining a number of zones corresponding to particular puncturing patterns, a number of input bits for each zone, a permutation transformation for each zone, a puncturing transformation for each zone, and a set of zone signatures comprising a single zone signature for each zone. In one embodiment, a zone index may indicate corresponding permutation parameters, such that a zone signature for a particular zone corresponds to permutation transformation for that zone, for example.

Referring to step 220 of flowchart 200 in FIG. 2, step 220 comprises an iterative processing step that includes performing steps 230 through 280, for example, for each block in blocks of data 130, as shown in FIG. 1. Although depicted as a compartmentalized set of blocks in FIG. 1, it should be understood that blocks of data 130 may be periodically added to as digital signal processor 110, for example, executes step 220. For example, an external device may periodically add new data to blocks of data 130, such that step 220 continues until such external device stops adding new data to block of data 130.

Moving to step 230 of flowchart 200 in FIG. 2, step 230 comprises computing a block signature from pre-computed puncturing thresholds. In one embodiment, a first element of an error vector for a block of data in blocks of data 130 may be used to compute a block signature specific to that block, for example. Such block signature may use substantially the same programming code used to pre-compute a set of zone signatures, as explained above, and may employ the pre-computed puncturing thresholds, such that any computed block signature corresponds to a pre-computed zone signature.

Referring to step 240 of flowchart 200 in FIG. 2, step 240 comprises matching a block signature to one of a set of pre-computed zone signatures, wherein the matching yields a vector predicate. As noted above, the programming code used to compute the block signature may be substantially the same as that used to pre-compute the zone signatures, such that the block signature matches at least one pre-computed zone signature. A vector predicate may comprise a vector configured to store a matching condition linking the block signature to a particular pre-computed zone signature, for example. In other embodiments, however, the vector predicate may be omitted where, for example, the matching allows one to derive a zone index directly from the matching.

Referring to step 250 of flowchart 200 in FIG. 2, step 250 comprises deriving a zone index from the vector predicate corresponding to the one matched pre-computed zone signature. As explained above, in other embodiments, a vector predicate may be omitted, and the zone index may be derived directly from the matching to the one matched pre-computed zone signature.

Referring to step 260 of flowchart 200 in FIG. 2, step 260 comprises loading the block being processed into a vector register. For example, this may be preferable to copying the data in the block to a new position in memory 120, for instance, or referring to the block directly. This step 260 may include sub-steps to pack data corresponding to the block being processed from double words to words, in order to facilitate further processing, for example.

Referring to step 270 of flowchart 200 in FIG. 2, step 270 comprises applying pre-computed permutation and puncturing transformations corresponding to the zone index, derived in step 250, for example, to the block in the vector register. Such transformations may delete bits from the block being processed, for example, or insert zeros into the block being processed, such that the transformed block comprises a number of bits, for example, different from the number of bits of the block before being transformed. By deleting or puncturing bits, or alternatively de-puncturing bits (e.g., adding zeros), embodiments of the present method provide rate matching or de-rate matching on digital signal processor 110. Moreover, such embodiments do so in a substantially more efficient manner than conventional methods by offloading substantial processing to a pre-computation step, as explained above. Moreover, such embodiments are substantially more cost effective that alternative means because they leverage digital signal processors rather than, for example, additional general computation units.

Referring to step 280 of flowchart 200 in FIG. 2, step 280 comprises writing the transformed block in the vector register to memory 120. In some embodiments, this step 280 may include sub-steps to unpack data prior to writing to memory 120. A transformed block may be written back to blocks of data 130, for example, or back to a completely different memory space in memory 120. In some embodiments, however, the transformation step 270 may be performed directly on a block of data in blocks of data 130, such that no writing to memory 120 need be performed for a block transformed by step 270 to reside in blocks of data 130, for example.

Thus, the present method provides efficient and cost effective rate matching and de-rate matching on digital signal processors.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An apparatus, comprising: a digital signal processor configured to: pre-compute permutation parameters common to a plurality of blocks, wherein the plurality of blocks are subject to a set of given puncturing parameters; and for each block in the plurality of blocks: compute a block signature from pre-computed puncturing thresholds; match the block signature to one of a set of pre-computed zone signatures; derive a zone index corresponding to the one matched pre-computed zone signature; apply pre-computed permutation and puncturing transformations corresponding to the zone index to the block.

2. The apparatus of claim 1, wherein the digital signal processor is further configured to: load the block into a vector register after deriving the zone index.

3. The apparatus of claim 2, wherein the digital signal processor is further configured to perform at least one of: apply the pre-computed permutation and puncturing transformations to the packed block in the vector register; unpack the transformed block in the vector register; or write the unpacked transformed block in the vector register to the memory.

4. The apparatus of claim 1, wherein the pre-computed permutation and puncturing transformations are applied to the block.

5. The apparatus of claim 1, wherein the transformed block is written to the vector register.

* * * * *